(12) United States Patent
Chong

(10) Patent No.: US 9,637,636 B2
(45) Date of Patent: May 2, 2017

(54) MANUFACTURING PROCESS FOR RICE HUSK FIBER SYNTHETIC RESIN POWDER AND RICE HUSK FIBER PRODUCT

(75) Inventor: Chenpang Chong, Fujian (CN)

(73) Assignee: Husk's Green Technology Co., Limited, Kowloon (HK)

( * ) Notice: Subject to any disclaimer, the term of this patent is extended or adjusted under 35 U.S.C. 154(b) by 396 days.

(21) Appl. No.: 14/401,619

(22) PCT Filed: May 21, 2012

(86) PCT No.: PCT/CN2012/000699
§ 371 (c)(1),
(2), (4) Date: Nov. 17, 2014

(87) PCT Pub. No.: WO2013/173939
PCT Pub. Date: Nov. 28, 2013

(65) Prior Publication Data
US 2015/0130108 A1 May 14, 2015

(51) Int. Cl.
| | |
|---|---|
| *C08L 97/00* | (2006.01) |
| *B29C 43/58* | (2006.01) |
| *C08L 1/02* | (2006.01) |
| *C08L 93/00* | (2006.01) |
| *C08L 97/02* | (2006.01) |
| *B29C 43/00* | (2006.01) |

(52) U.S. Cl.
CPC ............ *C08L 97/005* (2013.01); *B29C 43/58* (2013.01); *C08L 1/02* (2013.01); *C08L 93/00* (2013.01); *C08L 97/02* (2013.01); *B29C 43/003* (2013.01)

(58) Field of Classification Search
None
See application file for complete search history.

(56) References Cited

FOREIGN PATENT DOCUMENTS

| | | |
|---|---|---|
| CN | 1328082 A | 12/2001 |
| CN | 101747651 A | 6/2010 |
| CN | 101993558 A | 3/2011 |
| CN | 102690524 A | 9/2012 |

*Primary Examiner* — Stella Yi
(74) *Attorney, Agent, or Firm* — Rosenberg, Klein & Lee

(57) ABSTRACT

A manufacturing process for rice husk fiber synthetic resin powder includes grinding rice husks into rice husk powder, feeding the powder into a mixer, adding and uniformly mixing cellulose, starch, and water, removing and cooling the mixture into rice husk fiber powder; additionally putting natural resin and lignin into a reaction kettle, adding water and agitating uniformly into slurry, adding nano-silica and continuing agitating evenly, and after cooling, adding the rice husk fiber powder and continuing the agitation, cooling and removing the mixture, thus obtaining a paste material; and injecting the paste material into a flash drier to produce rice husk fiber synthetic resin powder. The rice husk fiber synthetic resin powder can be used to make rice husk fiber products such as tableware, toys, furniture and kitchenware that have good physical properties and are degradable into organic fertilizer, thereby being environmentally friendly and commercially promising.

6 Claims, No Drawings

MANUFACTURING PROCESS FOR RICE HUSK FIBER SYNTHETIC RESIN POWDER AND RICE HUSK FIBER PRODUCT

BACKGROUND OF THE INVENTION

1. Technical Field

The present invention relates to chemical materials, and more particularly to manufacturing processes for rice husk fiber synthetic resin powder and rice husk fiber products made therefrom.

2. Description of Related Art

Presently, most articles for daily use, such as tableware, furniture and kitchenware, as sold in the market, are made of plastic, timber and bamboo. These materials are disadvantageous for being not only expansive, but also against to sustainability. To be specific, plastic is also referred to as "white pollution" as it is undegradable in the Nature and tends to make soil impermeable. As to timer and bamboo, their use involves deforestation and waste-water pollution, thus being not environmentally friendly.

Particularly, the disposable tableware currently having extensive use is typically manufacturing from foam plastic that is foamed with Freon. As known, Freon has been identified as a factor of the observed ozone depletion. In addition, such foam plastic is extremely undegradable. China Patent Publication No. CN1212312A discloses degradable, disposable tableware and a manufacturing method thereof. This prior-art method uses husks or stems of crops as the raw material to be laminated under heat with urea-formaldehyde resin and melamine. However, melamine is expensive and likely to generate degradation products that harmful to the environment.

China is the No. 1 place of origin of rice, having an annual rice yield of 195 million tons, equal to 40% of its nationwide total grain yield, and 37% of the worldwide total grain yield. In this context, tens of mission tons of husks are peeled off from rice in China every. These rice husks have been traditionally regarded as agricultural waste, and are usually used as fuel or feed fillers for animals in the extensive rural area in China. For a long period, the use of rice husks have been undeveloped, making rice husks, as in fact valuable resources, totally wasted in vain.

On the other hand, in many developed countries, the applications of rice husks have been researched in depth, and include culture media for edible mushrooms, fuel for power generation, materials for cosmetics, food and chemical products. However, theses advanced applications of rice husks usually involve complicated processes that modify the nature of rice husks and then use the modified substances as new materials. There is little knowledge about "as-it-is" usage of rice husk. Thus, we do need a novel way to use rice husk as it is in mass manufacture.

SUMMARY OF THE INVENTION

The objective of the present invention is to meeting the foregoing need by providing manufacturing processes for rice husk fiber synthetic resin powder and for rice husk fiber products made therefrom. The manufacturing processes are practical and economic. The resin powder and therefor the rice husk fiber products are degradable, with constant quality, and environmentally friendly.

For achieving this objective, the present invention implements the following technical scheme: providing a manufacturing process for rice husk fiber synthetic resin powder, comprising the following steps:

(1). grinding 20-80 wt % rice husk into fine rice husk powder having a mesh size of 50-300;

(2). feeding the rice husk powder of Step (1) into a high-speed heating mixer, adding 5-35 wt % cellulose and 5-40 wt % starch, mixing well while introducing 10-35 wt % water, removing the mixture from the mixer, letting the mixture to cool, and thereby obtaining rice husk fiber powder;

(3). placing 15-35 wt % natural resin and 65-85 wt % lignin into a reaction kettle, adding 10-20 wt % water into the kettle, agitating the mixture uniformly into slurry, heating the mixture to 100-300° C., then adding 5-15 wt % nano-silica, mixing the mixture uniformly, cooling the kettle to a temperature below 120° C., adding 20-80 wt % rice husk fiber powder, keeping mixing, removing the well mixed mixture from the kettle, and thereby obtaining a paste material;

(4). pouring the paste material of Step (3) into a flash drier, drying the paste material with heat airflow of 60-120° C., removing the dried material from the drier when it has a moisture content of 5-15%, and thereby obtaining brownish-yellow rice husk fiber synthetic resin powder; and (5). cooling the rice husk fiber synthetic resin powder of Step (4) and packaging the cooled powder for storage as a final product of the rice husk fiber synthetic resin powder.

Preferably, the natural resin is one or more of powdered gum Arabic, gelatin, and hydrogenated rosin.

Preferably, the rice husk fiber powder when removed from drier has the moisture content below 8%.

Preferably, the mixing of Step (2) is performed at 15-50° C.

Preferably, the storage of Step (5) is performed at 15-35° C.

A manufacturing process for a rice husk fiber product, comprising the following steps:

<1>. preheating a high-temperature mold press to a mold temperature of 80-200° C., and setting the mold press at a pressure of 170-210 psi, then feeding the rice husk fiber synthetic resin powder into the mold press for molding, and removing the molded preform; and <2>. deburring the preform of Step <1> using a burr masher, and polishing the deburred preform using a polisher into the rice husk fiber product.

By using the aforementioned technical scheme, the present invention provides the following beneficial effects. First, the present invention uses rice husks that is a currently wasted agricultural by-product, so can turn garbage into useful resources. This novel use effectively reduces the impact of rice husks on the environment and makes rice husks valuable. The product of the present invention is highly waterproof, rigid, dense and smooth. Also the material is in natural non-toxic, economic and environmentally friendly, so is more suitable for tableware, toys, furniture, kitchenware and the like as compared with plastic, timber and bamboo. The salvage reduces the consumption of forests and can produce organic fertilizer as the material degrades in the Nature. The products made from such material are resistant to both high and low temperatures, and have excellent density and hardness, while having sustainable service life. All these make the disclosed environmentally-friendly material commercially promising.

DETAILED DESCRIPTION OF THE INVENTION

While some particular embodiments will be described below for illustrating the present invention, the scope of the present invention is not limited thereto.

Embodiment 1

In the present embodiment, 30 g of rice husks are ground into fine rice husk powder having a mesh size of 50. The rice husk powder is placed in a high-speed heating mixer to be mixed with 35 g of cellulose and 40 g of starch at 25° C., while 20 g of water is added. The mixture is then removed from the mixer for cooling. The cooled rice husk fiber powder has a moisture content below 8%.

Afterward, 15 g of gelatin and 85 g of lignin are placed into a reaction kettle, and agitated while 15 g of water is added so as to form homogeneous slurry. The slurry is then heated to 130° C., and mixed with 10 g of nano-silica. The kettle together with the mixture is then cooled to a temperature below 120° C. Then 50 g of rice husk fiber powder is added and the mixing is continued until it becomes homogeneous. The homogeneous mixture is cooled as a paste material. The paste material is transferred from the mixture to a flash drier where it is dried by hot airflow at 80° C. The dried material is removed from the drier when its moisture content becomes 5%. Thus, brownish-yellow rice husk fiber synthetic resin powder is produced and can be packaged for storage after cooled.

A high-temperature mold press has a ladle mold is preheated to a mold temperature of 120° C. Then 160 g of the foregoing rice husk fiber synthetic resin powder is fed into the ladle mold for molding. The molded preform is then removed from the mold, deburred using a burr masher, and polished using a polisher to be a final ladle product for table use.

Embodiment 2

In the present embodiment, 60 g of rice husks are ground into fine rice husk powder having a mesh size of 80. The rice husk powder is placed in a high-speed heating mixer to be mixed with 25 g of cellulose and 30 g of starch at 35° C., while 20 g of water is added. The mixture is then removed from the mixer for cooling. The cooled rice husk fiber powder has a moisture content below 8%.

Afterward, 35 g of powdered gum Arabic and 65 g of lignin are placed into a reaction kettle, and agitated while 18 g of water is added so as to form homogeneous slurry. The slurry is then heated to 150° C., and mixed with 10 g of nano-silica. The kettle together with the mixture is then cooled to a temperature below 150° C. Then 60 g of rice husk fiber powder is added and the mixing is continued until it becomes homogeneous. The homogeneous mixture is cooled as a paste material. The paste material is transferred from the mixture to a flash drier where it is dried by hot airflow at 100° C. The dried material is removed from the drier when its moisture content becomes 8%. Thus, brownish-yellow rice husk fiber synthetic resin powder is produced and can be packaged for storage after cooled.

A high-temperature mold press has a ladle mold for making a chopping board is preheated to a mold temperature of 140° C. Then 100 g of the foregoing rice husk fiber synthetic resin powder is fed into the ladle mold for molding. The molded preform is then removed from the mold, deburred using a burr masher, and polished using a polisher to be a final chopping board product for kitchen use.

Embodiment 3

In the present embodiment, 80 g of rice husks are ground into fine rice husk powder having a mesh size of 120. The rice husk powder is placed in a high-speed heating mixer to be mixed with 35 g of cellulose and 40 g of starch at 35° C., while 35 g of water is added. The mixture is then removed from the mixer for cooling. The cooled rice husk fiber powder has a moisture content below 8%.

Afterward, 20 g of hydrogenated rosin and 80 g of lignin are placed into a reaction kettle, and agitated while 20 g of water is added so as to form homogeneous slurry. The slurry is then heated to 180° C., and mixed with 15 g of nano-silica. The kettle together with the mixture is then cooled to a temperature below 150° C. Then 80 g of rice husk fiber powder is added and the mixing is continued until it becomes homogeneous. The homogeneous mixture is cooled as a paste material. The paste material is transferred from the mixture to a flash drier where it is dried by hot airflow at 120° C. The dried material is removed from the drier when its moisture content becomes 8%. Thus, brownish-yellow rice husk fiber synthetic resin powder is produced and can be packaged for storage after cooled.

A high-temperature mold press has a mold for making a toy block is preheated to a mold temperature of 170° C. Then 40 g of the foregoing rice husk fiber synthetic resin powder is fed into the ladle mold for molding. The molded preform is then removed from the mold, deburred using a burr masher, and polished using a polisher to be a final toy block product for amusement.

What is claimed is:

1. A manufacturing process for rice husk fiber synthetic resin powder, being characterized in comprising the following steps:
    (1) grinding 20-80 wt. % rice husk into fine rice husk powder having a mesh size of 50-300;
    (2) feeding the rice husk powder of step (1) into a high-speed heating mixer, adding 5-35 wt. % cellulose and 5-40 wt. % starch, mixing well while introducing 10-35 wt. % water, removing the mixture from the high-speed heating mixer, letting the mixture to cool, and thereby obtaining rice husk fiber powder;
    (3) placing 15-35 wt. % natural resin and 65-85 wt. % lignin into a reaction kettle, adding 10-20 wt. % water into the reaction kettle, agitating the mixture uniformly into slurry, heating the mixture to 100-300° C., then adding 5-15 wt. % nano-silica, mixing the mixture uniformly, cooling the reaction kettle to a temperature below 120° C., adding 20-80 wt. % rice husk fiber powder while mixing, removing the mixture from the reaction kettle, and thereby obtaining a paste material;
    (4) pouring the paste material of step (3) into a flash drier, drying the paste material with heat airflow of 60-120° C., removing the dried paste material from the flash drier when it has a moisture content of 5-15%, and thereby obtaining brownish-yellow rice husk fiber synthetic resin powder; and
    (5) cooling the rice husk fiber synthetic resin powder of step (4) and packaging the cooled powder for storage as a final product of the rice husk fiber synthetic resin powder.

2. The manufacturing process of claim 1, being characterized in that the natural resin is one or more of powdered gum Arabic, gelatin, and hydrogenated rosin.

3. The manufacturing process of claim 1, being characterized in that the rice husk fiber powder when removed from drier has the moisture content below 8%.

4. The manufacturing process of claim 1, being characterized in that the mixing of step (2) is performed at 15-50° C.

5. The manufacturing process of claim 1, being characterized in that the storage of step (5) is performed at 15-35° C.

6. A manufacturing process for a rice husk fiber product made from the rice husk fiber synthetic resin powder of claim 1, being characterized in comprising the following steps:
   (1) preheating a high-temperature mold press to a mold temperature of 80-200° C., and setting the mold press at a pressure of 170-210 psi, then feeding the rice husk fiber synthetic resin powder into the mold press for molding a preform, and removing the molded preform; and
   (2) deburring the preform of step (1) using a burr masher, and polishing the deburred preform using a polisher into the rice husk fiber product.

* * * * *